H. W. CROWELL.
MACHINE FOR SAWING VEGETABLE IVORY NUTS.
APPLICATION FILED NOV. 13, 1920.
1,409,676. Patented Mar. 14, 1922.
3 SHEETS—SHEET 1.
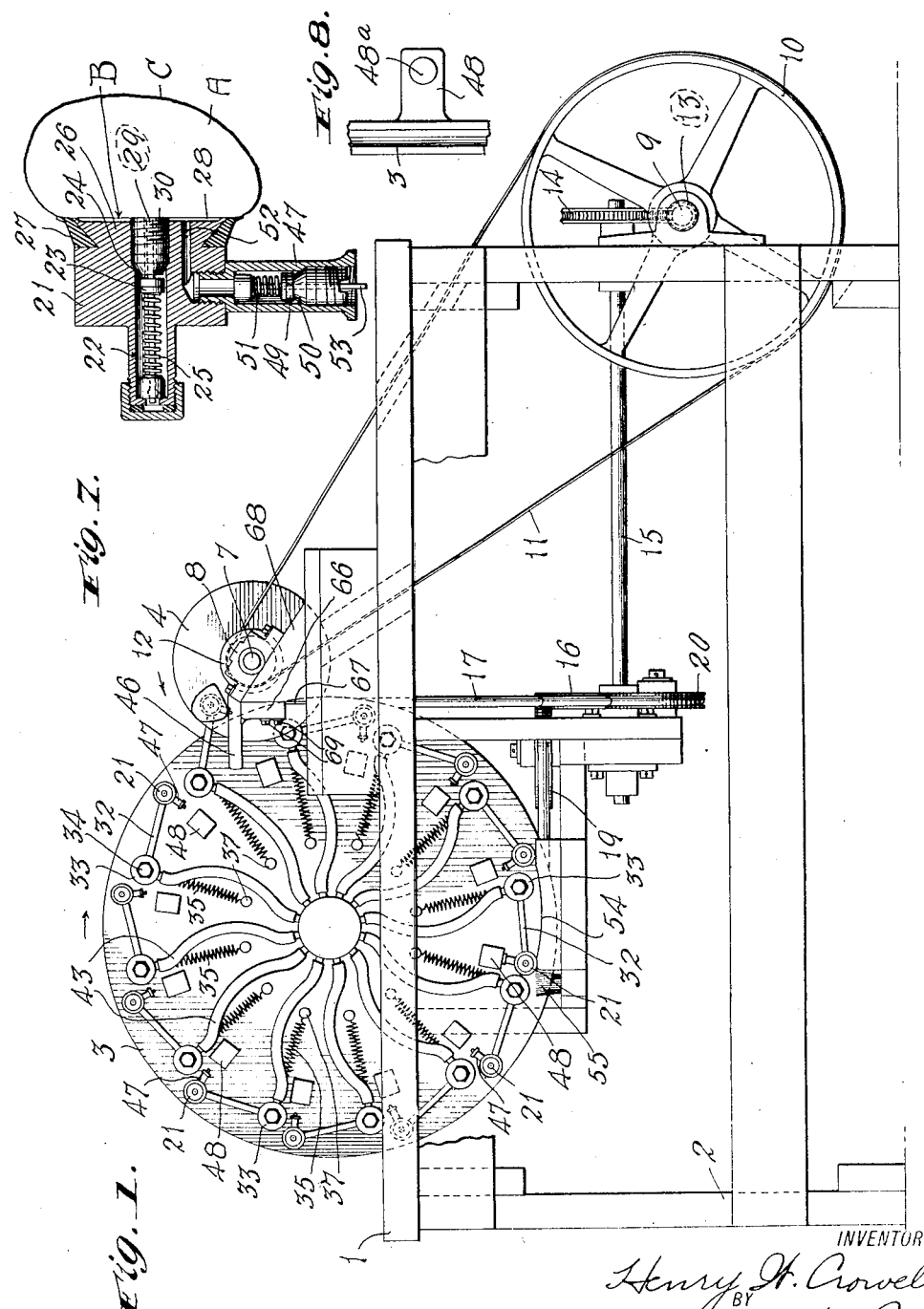
INVENTOR
Henry W. Crowell,
BY
Everett Rook,
ATTORNEYS.

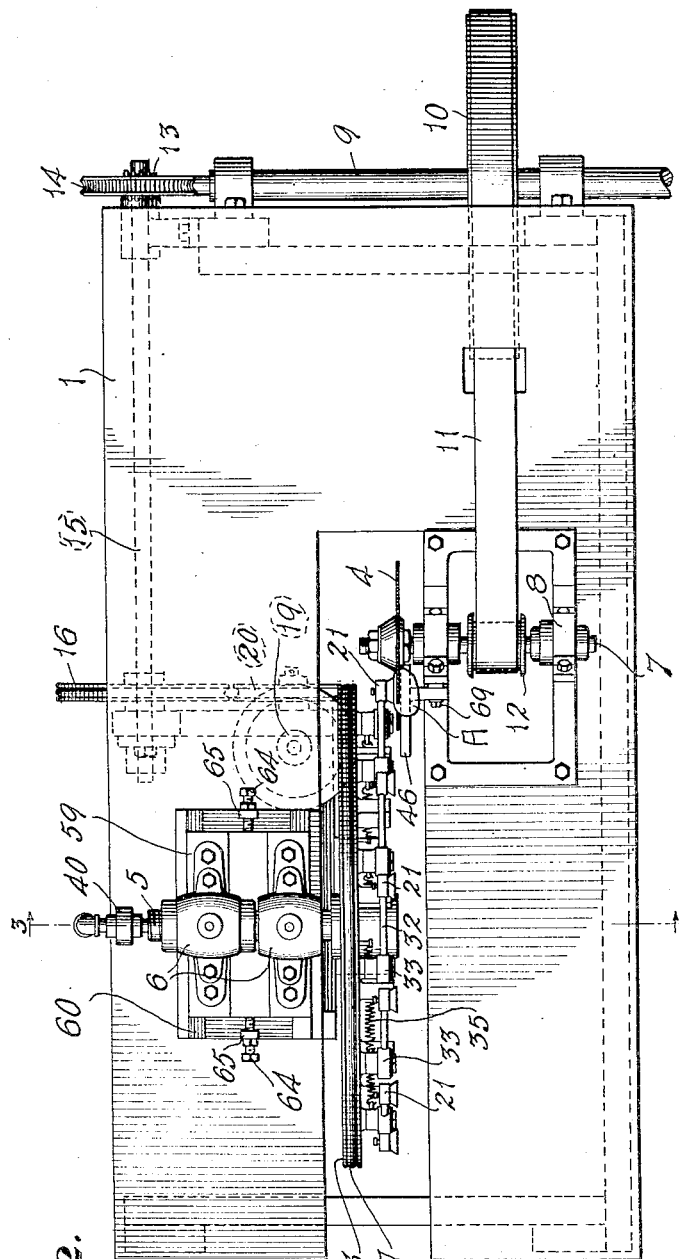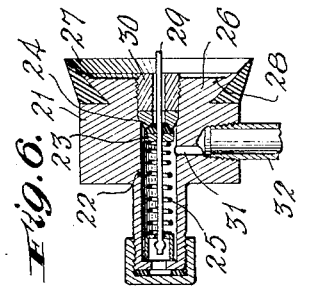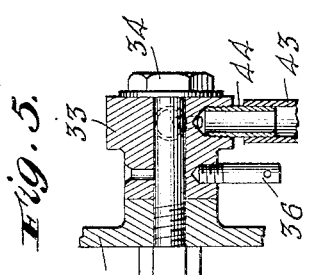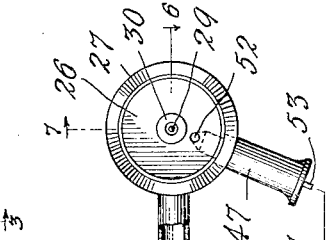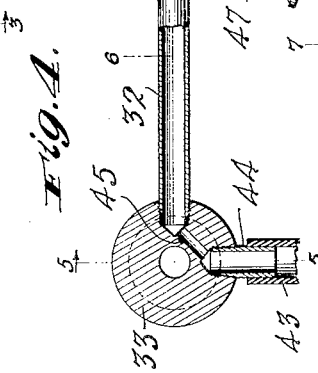

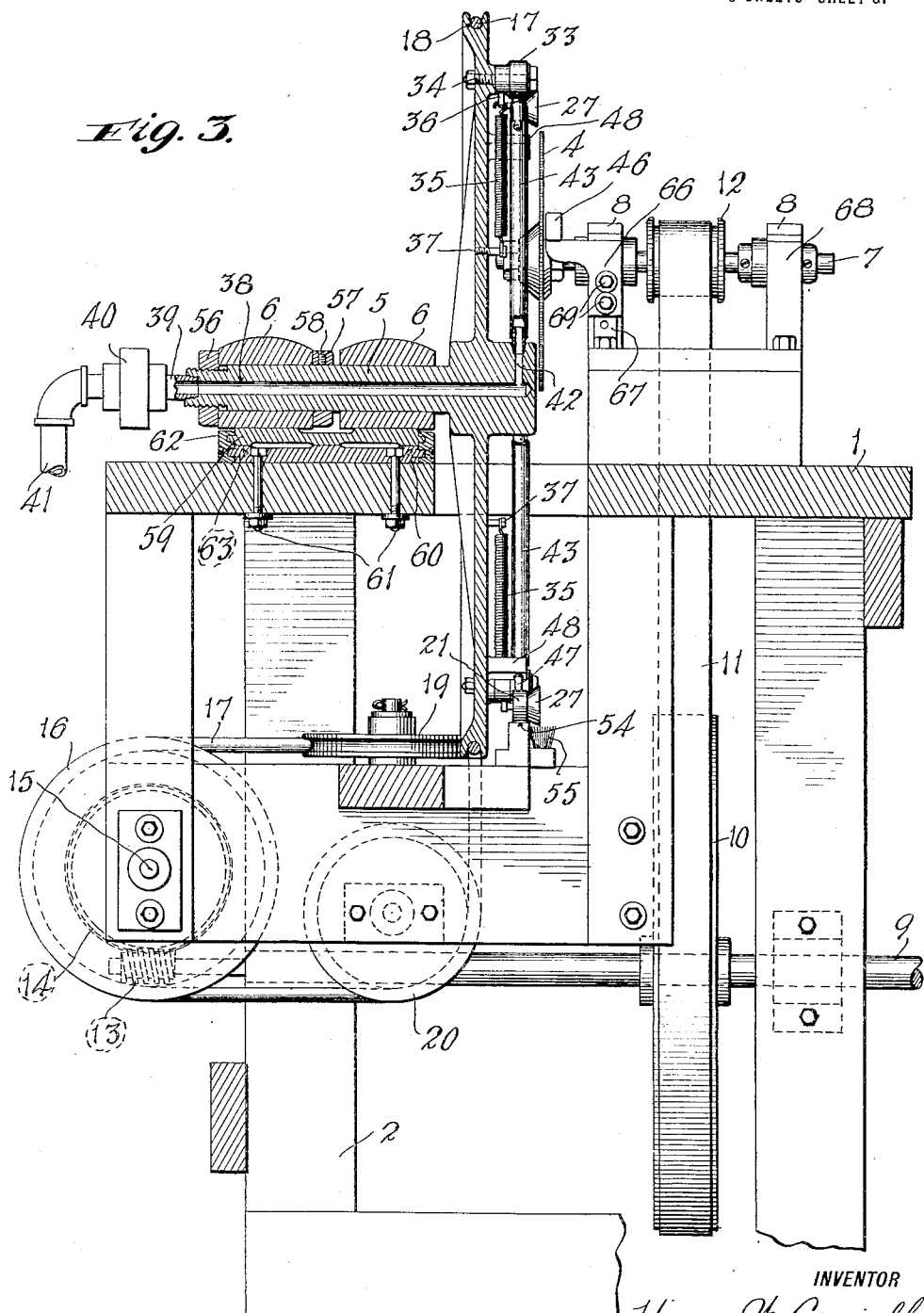

UNITED STATES PATENT OFFICE.

HENRY W. CROWELL, OF GLEN RIDGE, NEW JERSEY.

MACHINE FOR SAWING VEGETABLE-IVORY NUTS.

1,409,676.  Specification of Letters Patent.  Patented Mar. 14, 1922.

Application filed November 13, 1920. Serial No. 423,903.

*To all whom it may concern:*

Be it known that I, HENRY W. CROWELL, a citizen of the United States, and a resident of Glen Ridge, in the county of Essex and State of New Jersey, have invented new and useful Improvements in Machines for Sawing Vegetable-Ivory Nuts, of which the following is a specification.

This invention relates in general to sawing machines and more particularly to a machine for "slabbing" vegetable ivory nuts in the manufacture of buttons.

The objects of the invention are to provide a machine of the character described for automatically sawing vegetable ivory nuts whereby the only necessary attention of the operator is the feeding of the nuts into the machine, thereby greatly reducing the cost of manufacture of buttons; to provide such a machine in which the nuts after being fed into the machine are automatically conveyed to a saw and positively and mechanically held in proper relation to the saw during the cutting operation; to provide a machine of this character with means for automatically discharging or releasing the "slab" after the cutting operation; to provide a machine comprising a carrier for a plurality of nuts whereby the nuts are continuously and successively conveyed to the saw and discharged from the machine; to thus utilize a carrier having a plurality of vacuum chucks for automatically gripping the nuts and securely holding them against the saw; to provide means for automatically releasing the vacuum in said chucks after the cutting operation to discharge the "slabs" from the machine; to provide improved means for adjusting the carrier relative to the saw to vary the thickness of the "slab" to be cut from the ivory nut; to provide means whereby the various nuts are automatically positioned in the chucks to obtain "slabs" of uniform thickness from the nuts; to obtain a machine of the character described which is comparatively simple and inexpensive in construction and which can be easily and efficiently operated by an unskilled person; and to obtain other results and advantages as may be brought out by the following description.

Referring to the accompanying drawings, in which like numerals of reference indicate the same parts throughout the several views, Figure 1 is a side elevation of a machine constructed in accordance with my invention;

Figure 2 is a top plan view thereof;

Figure 3 is an enlarged transverse vertical sectional view taken on the line 3—3 of Fig. 2;

Figure 4 is an enlarged detached side elevation of one of the chucks and its supporting knuckle, portions of the knuckle being shown in section;

Figure 5 is a transverse sectional view through the knuckle taken on the line 5—5 of Fig. 4;

Figure 6 is a horizontal sectional view through the chuck, taken on the line 6—6 of Fig. 4;

Figure 7 is a transverse sectional view through the chuck taken on the line 7—7 of Fig. 4, and Figure 8 is a fragmentary plan view of a portion of the carrier wheel and one of the buffer blocks for operating the relief valve of the chuck.

In the specific embodiment of my invention shown in the drawings the numeral 1 designates a table or other suitable support which may be conveniently mounted on legs or other framework 2, at an elevation convenient to the operator, the said table serving as a support for a carrier 3 for conveying the vegetable ivory nuts to be sawed to a saw 4 and holding the same thereagainst during the cutting operation. The carrier 3 may be of any desired construction, but is preferably an endless carrier, and in the present instance is shown as comprising a wheel having a stub shaft 5 projecting centrally from one side thereof and journaled in bearings 6.

The saw 4 may be of the conventional circular type and is mounted upon a shaft 7 journaled in bearings 8 at the side of the carrier wheel 3 opposite the stub shaft 5 and substantially parallel to the said wheel adjacent the periphery thereof. The carrier wheel 3 and saw 4 may be conveniently rotated in the respective directions indicated by arrows on Figure 1 from a common drive shaft 9 journaled upon the framework 2 and driven from any suitable source of power. A pulley 10 is fixed upon said shaft 9 and through a belt 11 passing over a smaller pulley 12 on the saw shaft 7 drives the saw at substantially 5000 R. P. M. The shaft 9 is provided with a worm 13 meshing with a worm wheel 14 mounted on a counter shaft 15 journaled in the framework 2 at substantially right angles to the shaft 9. A pulley 16 is fixed upon said shaft 15 and receives an endless drive belt 17 for the carrier wheel 3 which passes around the grooved periphery 18 of the wheel. From the pulley 16 the drive belt 17 passes around an idler pulley 19, thence onto the grooved periphery of the wheel 3 at the underside thereof, and then around the wheel 3 to a second idler pulley 20 back to the drive pulley 16. This gearing is preferably arranged so that the carrier wheel 3 will be driven in the direction of the arrow at substantially 5.4 R. P. M.

A plurality of chucks or holders 21 for the vegetable ivory nuts are mounted upon the side of the carrier wheel 3 adjacent the saw and toward the periphery of the wheel. In the present instance the chucks 21 are designed to hold the vegetable ivory nuts through the action of a vacuum. Each chuck comprises a casing having an axial passage 22 therethrough to receive a check valve 23 which is normally closed against a seat 24 by a spring 25 in the direction of the face of the chuck. The face of the chuck is provided with an annular dovetail projection 26 which serves as a support for a rubber ring 27 which serves to form an airtight connection between an ivory nut A, shown in Figure 7, and the chuck. In applying an ivory nut to the chuck the nut is pressed against the rubber ring 27 as shown in Figure 7, and the projection 26 serves as a stop, the front of the projection 26 being recessed as at 28 to form a vacuum chamber b 'ween the nut and the face of the chuck. The valve stem 29 projects loosely through the valve seat 24 and a screw plug 30 which serves to hold the valve seat in position in the passage 22, and as the nut A is pressed against the rubber ring 27 it engages the valve stem 29 to unseat the valve 23. A duct 31 communicates between the passage 22 behind the valve 23 and a pipe 32 which serves to support the chuck 21 upon a knuckle 33 on the carrier wheel 3. The knuckle 33 is pivotally supported upon the carrier wheel by an axial bolt 34 arranged substantially parallel to the axis of the wheel. It will thus be seen that the chucks 21 are free to swing about the pivot bolts 34 in a plane parallel to the side of the wheel 3. For the purpose of maintaining the chucks in the position shown in Figure 1 and overcoming the weight thereof and the weight of the nut a helical spring 35 has one end thereof connected to a pin 36 projecting radially from the knuckles 33 while the other end thereof is connected to a stud 37 in the face of the wheel 3, the said stud 37 being arranged in radial alinement with the axis of the wheel and the centers of the corresponding pivot bolt 34. The action of the springs 35 thus tends to rotate the knuckles 33 to bring the pins 36 into radial position with respect to the wheel, and the tension of the springs is sufficient to support the chucks and the nuts.

For the purpose of creating a vacuum in the chuck the stub shaft 5 of the carrier wheel 3 is provided with an internal passage 38, the outer end of which has a threaded connection with a nipple 39 which connects with one end of a rotating coupling 40 the other end of said coupling being connected to a pipe 41 from any suitable vacuum pump or the like. The inner end of the passage 38 communicates with a plurality of radial ducts 42 in the hub of the wheel which correspond in number to the chucks 21. The ducts 42 connect with the corresponding knuckles 33 by means of flexible hose 43 connected by nipples 44 to the corresponding knuckles. A transverse duct 45 in each of the knuckles establishes communication between the corresponding hose 43 and the chuck supporting pipe 32. It will thus be seen that the chucks are always in communication with a vacuum pump or the like, and that when the valves 23 thereof are unseated by the application of the ivory nuts to the chuck the nuts will be securely held on the chucks by the vacuum established in the chambers 28 thereof.

The ivory nuts A are fed to the chucks 21 by an operator as the chucks are rotated by the wheel 3 with the flat or "slab" sides B thereof in engagement with the rubber rings 27 of the chucks. As a chuck approaches the saw 4 the nut A carried thereby engages a rest or guide 46 which interrupts the rotation of the nut with the carrier wheel 3. As the wheel rotates the corresponding knuckle 33 rotates upon its pivot bolt 34 which constantly approaches closer to the rest 46. This causes a pushing of the nut against the saw 4, in substantially a straight path at an angle to the direction of travel of the carrier 3, and as the saw rotates it cuts through the nut as shown by Figure 1 of the drawings severing the bark side of the nut from the flat or "slab" side thereof. This rotation of the knuckle 33 is against the action of the corresponding spring 35, and as soon as the bark side C of the nut is severed it falls off the rest 46, whereupon the spring 35 swings the chuck 21 inwardly toward the center of the carrier wheel. This action causes a momentary and forceful engagement of a vacuum relief valve 47 upon the chuck with a buffer block 48 to break the vacuum in the chuck and release the "slab" of the nut therefrom, thereby allowing the vacuum valve 23 to close under the influence of the spring 25. The relief valve 47 comprises a casing which is secured in the chuck body and has a valve 49 therein influenced against its seat 50 by a spring 51. The valve casing is connected with the vacuum chamber 28 in the chuck by means of a duct 52 and the valve stem 53 projects outwardly from the outer end of the valve casing, so that when the valve casing contacts with the buffer block 48 the stem 53 is forced inwardly to unseat the valve and relieve the vacuum in the chamber 28. It will of course be understood that the relief passages for the vacuum must be of greater capacity than the vacuum passages in order to immediately break the vacuum in the chuck and release the "slab" of the nut therefrom. It will be understood that this contact of the relief valve 47 with the buffer block is caused by the stored up tension of the spring 35 and the momentum of the returning chuck 21 so that the chuck passes beyond its normal position into momentary engagement with the buffer 48. To prevent injury to the end of the valve stem 53 and the valve casing the buffer block is preferably provided with a comparatively soft core 48a, preferably of wood, it being understood that the buffer blocks 48 are preferably formed integrally with the carrier wheel 3 which is of metal.

If the above-mentioned momentary contact of the relief valve 47 with the buffer block is insufficient to dislodge the "slab" from the chuck, I may provide a cam 54 at the underside of the wheel adapted to engage the chuck body and force the same inwardly of the wheel so as to positively and forcibly cause engagement of the relief valve 47 with its corresponding buffer block 48, the cam 54 being so arranged that the relief valve 49 is held open for a short period of time. If the "slab" then fails to fall from the chuck, I may provide a brush 55 adjacent the cam to engage the "slab" of the nut as the wheel rotates, the said brush positively disengaging the "slab" from the chuck. It will be noted that the "block" and "slab" of the nut are released successively so as to facilitate in the collection of the respective parts of the nut in separate receptacles or at different points.

It will be noted that the thickness of the "slab" which is to be cut from the nut is determined by the distance between the face of the extension 26 on the chuck and the saw 4, and this distance may be varied by movement of the wheel 3 toward and from the plane of the saw 4. I may thus mount the stub shaft of the wheel slidably in the bearing 6 and provide a threaded adjustable collar 56 in the outer end of the shaft to bear against the corresponding bearing 6. Obviously, tightening of the collar 56 against the bearing will cause a sliding of the shaft 5 to cause movement of the wheel 3 away from the saw, and for the purpose of maintaining the wheel in adjusted position I may provide a second collar 57 at the opposite side of the bearing 56 adapted to be secured to the shaft by a set screw 58.

In some instances it may be desirable to adjust the wheel 3 in a diametric direction in its own plane toward and from the saw 4 in order to accommodate various sized ivory nuts and ensure a complete cut therethrough by the saw. For this purpose the bearings 6 may be mounted on a bearing plate 59 slidably adjustable on a base plate 60 secured to the table 1 by means of the bolts 61, the said bearing plate 59 and base plate 60 being connected by grooved guides 62 secured to the sides of the base plate 60 by the screws 63 shown in Figure 3 of the drawing. With this construction it will be seen that bodily movement of the bearings 6 and wheel 3 in a diametric direction toward or from the saw 4 is made possible, and for the purpose of maintaining the bearing plate 59 in any adjusted position set screws 64 are provided in upstanding lugs 65 on the ends of the base plate 60.

It may also be desirable to adjust the guide of rest 46 for the nut vertically, and for this purpose the rest is provided with a grooved arm 66 adapted to fit over the vertical ribbed side 67 of the saw shaft bearing supports 68, the said rest being vertically adjustable on said support 68 by means of the cap screws 69.

The vacuum chucks enable rapid and accurate "slabbing" of ivory nuts, the nuts being automatically and quickly gripped by simple forcing of the same against the face of the chuck, thus eliminating the slow and tedious positioning of the nuts in lever or cam jaws and the operation of such jaws as has been heretofore necessary. The vacuum chucks carry the nuts to the rest 46 and prevent movement of the nuts thereon, the rest assisting the chucks to hold the nuts under action of the saw.

While I have shown and described one possible embodiment of my invention, it will be understood that this is for the purpose of illustrating the principles thereof only; and that many modifications and changes can be made in the detail construction of the invention by those skilled in the art without departing from the spirit or scope thereof. Therefore, I do not desire to be limited in the construction and use of my invention except as required by the following claims when construed in the light of the prior art.

Having thus described the invention, what I claim is:

1. In a machine for sawing ivory nuts, the combination of a saw, suction means for holding a nut while being operated upon by said saw, means for causing relative movement of said holding means and said saw to cause the saw to cut said nut, and a rest engaged by said nut during the sawing operation.

2. In a machine for sawing ivory nuts, the combination of a saw, suction means for holding a nut while being operated upon by said saw, means for causing relative movement of said holding means and said saw to cause the saw to cut said nut, and a rest engaged by said nut during the sawing operation, said saw intervening between said holding means and said rest during the sawing operation.

3. In a machine for sawing ivory nuts, the combination of a saw, a carrier for conveying a nut to said saw, a vacuum chuck on said carrier for holding said nut while being operated upon by said saw, and a rest to be directly engaged by said nut while the same is being operated upon by said saw.

4. In a machine for sawing ivory nuts, the combination of a saw, a carrier for conveying a nut to said saw, means on said carrier for holding said nut, and a rest positioned adjacent said holding means and directly engaged by said nut during the sawing operation, said saw being disposed between said holding means and said rest during the sawing operation.

5. In a machine for sawing ivory nuts, the combination of a saw, a carrier for conveying a nut to said saw arranged in a plane substantially parallel to said saw, means on said carrier for gripping one side of a nut, and a rest for said nut arranged on the side of said saw opposite said holding means to be engaged by said nut during the sawing operation, said saw being disposed between said holding means and said rest during the sawing operation.

6. In a machine for sawing ivory nuts, the combination of a saw, a carrier for conveying a nut to said saw, a vacuum chuck on said carrier to grip one side of said nut, and a rest adjacent said chuck to be directly engaged by said nut during the sawing operation.

7. In a machine for sawing ivory nuts, the combination of a saw, a carrier for conveying a nut to said saw, a vacuum chuck on said carrier to grip one side of said nut, and a rest adjacent said chuck to be directly engaged by said nut during the sawing operation, said rest being arranged on the side of the saw opposite said chuck.

8. In a machine for sawing ivory nuts, the combination of a saw, a carrier to convey a nut to said saw, means pivotally mounted on said carrier for holding a nut, and a rest for said nut during the sawing operation, said rest interrupting movement of the nut with said carrier.

9. In a machine for sawing ivory nuts, the combination of a saw, a carrier to convey a nut to said saw, means mounted on said carrier for holding a nut, and a rest directly engaged by a portion of said nut during the sawing operation arranged on the side of said saw opposite said holding means, whereby the portion of the nut on said rest is severed by said saw and the other portion is held by said holding means.

10. In a machine for sawing ivory nuts, the combination of a saw, a carrier to convey a nut to said saw, means pivotally mounted on said carrier for holding a nut, and a rest arranged on the side of said saw opposite said holding means to be directly engaged by the nut, said rest interrupting the movement of said holding means with said carrier and the severance of the portion of said nut on said rest allowing said holding means to resume its normal position, and means for automatically releasing the portion of the nut held by said holding means upon the return thereof to normal position.

11. In a machine for sawing ivory nuts, the combination of a saw, a carrier to convey a nut to said saw, a suction means mounted on the carrier for gripping one side of a nut with the remainder thereof exposed to hold the nut during the sawing operation whereby the exposed portion of said nut falls away by gravity after the sawing operation, and means for automatically releasing the portion of said nut held by said holding means after the sawing operation.

12. In a machine for sawing ivory nuts, the combination of a saw, a carrier for conveying a nut to said saw arranged in a plane substantially parallel to said saw, means mounted on said carrier for gripping one side of a nut and movable with and independently of said carrier, and a rest arranged at the side of said saw opposite said holding means to be engaged by said nut and interrupt the movement thereof with said carrier and force the nut against the edge of said saw.

13. In a machine of the character described, the combination of a cutter, a carrier to convey the object to be operated upon to said cutter, a vacuum chuck mounted on said carrier and movable with and relatively to the same to hold the object to be operated upon, means for establishing communication between said chuck and a source of vacuum, means for interrupting movement of said chuck with said carrier and deflecting the same toward said cutter to force the object thereagainst, means for returning said chuck to normal position after the cutting operation, and means for automatically breaking the vacuum in said chuck upon the returning thereof to normal position to release the object from the chuck.

14. In a machine of the character described, the combination of a cutter, a carrier to convey the object to be operated upon to said cutter, a vacuum chuck mounted on said carrier and movable with and relatively to the same to hold the object to be operated upon, means for establishing communication between said chuck and a source of vacuum, means for interrupting movement of said chuck with said carrier and deflecting the same toward said cutter to force the object thereagainst, means for returning said chuck to normal position after the cutting operation, a relief valve for breaking the vacuum in said chuck, and means for automatically opening said valve upon the returning of said chuck to normal position.

15. In a machine of the character described, the combination of a cutter, a carrier to convey the object to be operated upon to said cutter, a vacuum chuck mounted on said carrier and movable with and relatively to the same to hold the object to be operated upon, means for establishing communication between said chuck and a source of vacuum, means for interrupting movement of said chuck with said carrier and deflecting the same toward said cutter to force the object thereagainst, means for returning said chuck to normal position after the cutting operation, a relief valve for breaking the vacuum in said chuck, and a buffer, said means for returning the chuck to normal position causing forcible engagement of said relief valve with said buffer to open the valve and break the vacuum in said chuck to release the object from said chuck.

16. In a machine of the character described, the combination of a cutter, a carrier to convey the object to be operated upon to said cutter, a vacuum chuck mounted on said carrier and movable with and relatively to the same to hold the object to be operated upon, means for establishing communication between said chuck and a source of vacuum, a relief valve to break the vacuum in said chuck, a buffer, and cam means for causing forcible engagement of said relief valve with said buffer to open the valve and release said object from the chuck.

17. In a machine of the character described, the combination of a cutter, a carrier to convey the object to be operated upon to said cutter, a vacuum chuck mounted on said carrier and movable with and relatively to the same to hold the object to be operated upon, means for establishing communication between said chuck and a source of vacuum, means for interrupting movement of said chuck with said carrier and deflecting the same toward said cutter in one direction to force the object thereagainst, means for returning said chuck to normal position after the cutting operation whereby momentum of the returning chuck forces the chuck momentarily beyond normal position in the direction opposite said first movement, and means for breaking the vacuum in said chuck when the same passes beyond the normal position.

18. In a machine for sawing ivory nuts, the combination of a saw, a carrier for conveying a nut to said saw arranged in a plane substantially parallel to said saw, means pivotally mounted on said carrier on an axis at right angles to the direction of travel of said carrier for gripping one side of a nut, and a rest arranged at the side of said saw opposite said holding means to be engaged by said nut and deflect the same toward said saw to force the nut thereagainst.

19. The method of "slabbing" ivory nuts consisting in gripping a nut on the "slab" side thereof with the remainder of the nut exposed, and causing engagement of said nut with a saw between said "slab" side and the remaining portion of the nut.

20. The method of "slabbing" ivory nuts consisting in gripping the "slab" side of a nut by suction and thus holding the nut in engagement with a saw.

HENRY W. CROWELL.